(12) United States Patent
Kim et al.

(10) Patent No.: US 7,768,571 B2
(45) Date of Patent: Aug. 3, 2010

(54) OPTICAL TRACKING SYSTEM USING VARIABLE FOCAL LENGTH LENS

(75) Inventors: Tae Hyeon Kim, Taejon (KR); Gyoung Il Cho, Seoul (KR); Cheong Soo Seo, Seoul (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 1122 days.

(21) Appl. No.: 10/979,619

(22) Filed: Nov. 2, 2004

(65) Prior Publication Data

US 2005/0206773 A1    Sep. 22, 2005

Related U.S. Application Data

(63) Continuation-in-part of application No. 10/896,146, filed on Jul. 21, 2004, now Pat. No. 7,215,882, and a continuation-in-part of application No. 10/893,039, filed on Jul. 16, 2004, now Pat. No. 7,239,438, and a continuation-in-part of application No. 10/872,241, filed on Jun. 18, 2004, now Pat. No. 7,382,516, and a continuation-in-part of application No. 10/857,280, filed on May 28, 2004, now Pat. No. 6,999,226, and a continuation-in-part of application No. 10/857,714, filed on May 28, 2004, now Pat. No. 7,161,729, and a continuation-in-part of application No. 10/857,796, filed on May 28, 2004, now Pat. No. 6,934,073, and a continuation-in-part of application No. 10/855,287, filed on May 27, 2004, now Pat. No. 6,934,072, and a continuation-in-part of application No. 10/855,715, filed on May 27, 2004, now Pat. No. 7,031,046, and a continuation-in-part of application No. 10/855,554, filed on May 27, 2004, now Pat. No. 6,970,284, and a continuation-in-part of application No. 10/822,414, filed on Apr. 12, 2004, now Pat. No. 7,068,416, and a continuation-in-part of application No. 10/806,299, filed on Mar. 22, 2004, now Pat. No. 7,057,826.

(51) Int. Cl.
H04N 5/232 (2006.01)
(52) U.S. Cl. .................... 348/345; 348/335
(58) Field of Classification Search ............. 348/335, 348/340, 241; 359/291
See application file for complete search history.

(56) References Cited

U.S. PATENT DOCUMENTS 2,002,376 A    5/1935    Mannheimer (Continued)

FOREIGN PATENT DOCUMENTS

| JP | 08-043881 | 2/1996 |
| JP | 11-069209 | 3/1999 |
| JP | 2002-288873 | 10/2002 |

OTHER PUBLICATIONS

Boyd, 2003, "Fast-response Variable focusing Micromirror Array Lens," Proceeding of SPIE vol. 5055: 278-286.*
Kaneko et al., 200, "Quick Response Dynamic Focusing Lens using Multi-Layered Piezoelectric Bimorph Actuator," Proceeding of SPIE vol. 4075: 24-31.*

Primary Examiner—Tuan Ho

(57) ABSTRACT

An optical tracking system using a variable focal length lens includes at least one camera system, and the at least one camera system includes an objective lens system, configured to receive an object image, and at least one micromirror array lens, optically coupled to the objective lens system, configured to focus the object image received by the objective lens system onto an image sensor. The image sensor is optically coupled to the micromirror array lens, configured to receive the focused object image from the micromirror array lens and to sense the focused object image. The advantages of the present invention include ability to rapidly change the focal length and optical axis of a camera system, allowing for high-resolution, wide-angle imaging.

21 Claims, 6 Drawing Sheets

U.S. PATENT DOCUMENTS

| | | | |
|---|---|---|---|
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A * | 2/2000 | Michalicek et al. | 359/224 |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple | |
| 6,649,852 B2 | 11/2003 | Chason | |
| 6,650,461 B2 | 11/2003 | Atobe | |
| 6,658,208 B2 | 12/2003 | Watanabe | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura | |
| 6,934,072 B1 | 8/2005 | Kim | |
| 6,934,073 B1 | 8/2005 | Kim | |
| 6,958,777 B1 | 10/2005 | Pine | |
| 6,970,284 B1 | 11/2005 | Kim | |
| 6,995,909 B1 | 2/2006 | Hayashi | |
| 6,999,226 B2 | 2/2006 | Kim | |
| 7,023,466 B2 | 4/2006 | Favalora | |
| 7,031,046 B2 | 4/2006 | Kim | |
| 7,046,447 B2 | 5/2006 | Raber | |
| 7,068,416 B2 | 6/2006 | Gim | |
| 7,077,523 B2 | 7/2006 | Seo | |
| 7,161,729 B2 | 1/2007 | Kim | |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 | 4/2003 | Yoo | |
| 2003/0174234 A1 | 9/2003 | Kondo | |
| 2003/0184843 A1 | 10/2003 | Moon | |
| 2004/0009683 A1 | 1/2004 | Hiraoka | |
| 2004/0012460 A1 | 1/2004 | Cho | |
| 2004/0021802 A1 | 2/2004 | Yoshino | |
| 2004/0052180 A1 | 3/2004 | Hong | |
| 2004/0246362 A1 | 12/2004 | Konno | |
| 2004/0252958 A1 | 12/2004 | Abu-Ageel | |
| 2005/0024736 A1 | 2/2005 | Bakin | |
| 2005/0057812 A1 | 3/2005 | Raber | |
| 2005/0136663 A1 | 6/2005 | Terence Gan | |
| 2005/0174625 A1 | 8/2005 | Huiber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264870 A1 | 12/2005 | Kim | |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0209439 A1 | 9/2006 | Cho | |

* cited by examiner

OPTICAL TRACKING SYSTEM USING VARIABLE FOCAL LENGTH LENS

REFERENCE TO RELATED APPLICATIONS

This application is a continuation-in-part of, and claims priority to U.S. patent application Ser. No. 10/806,299, filed Mar. 22, 2004 now U.S. Pat. No. 7,057,826, U.S. patent application Ser. No. 10/822,414, filed Apr. 12, 2004 now U.S. Pat. No. 7,068,416, U.S. patent application Ser. No. 10/855,554, filed May 27, 2004 now U.S. Pat. No. 6,970,284, U.S. patent application Ser. No. 10/855,715, filed May 27, 2004 now U.S. Pat. No. 7,031,046, U.S. patent application Ser. No. 10/855,287, filed May 27, 2004 now U.S. Pat. No. 6,934,072, U.S. patent application Ser. No. 10/857,796, filed May 28, 2004 now U.S. Pat. No. 6,934,073, U.S. patent application Ser. No. 10/857,714, filed May 28, 2004 now U.S. Pat. No. 7,161,729, U.S. patent application Ser. No. 10/857,280, filed May 28, 2004 now U.S. Pat. No. 6,999,226, U.S. patent application Ser. No. 10/872,241, filed Jun. 18, 2004 now U.S. Pat. No. 7,382,516, U.S. patent application Ser. No. 10/893,039, filed Jul. 16, 2004 now U.S. Pat. No. 7,239,438, U.S. patent application Ser. No. 10/896,146, filed Jul. 21, 2004 now U.S. Pat. No. 7,215,882, all of which are hereby incorporated by reference.

FIELD OF THE INVENTION

The present invention relates to optical systems in general and more specifically to optical tracking systems.

BACKGROUND OF THE INVENTION

Movement detection/tracking systems (optical tracking systems or tracking systems) have numerous applications, including those detailed in the following patents; autonomous vehicles (U.S. Pat. No. 6,535,114), monitoring systems (U.S. Pat. No. 6,690,374), sports cameras (U.S. Pat. No. 6,567,038), conference video systems (U.S. Pat. No. 6,507,366), surgery (U.S. Pat. Nos. 6,725,079 and 6,662,036), positioning (U.S. Pat. No. 6,490,473), inspection (U.S. Pat. No. 6,259,960), spotlighting (U.S. Pat. No. 6,079,862), and machining (U.S. Pat. No. 6,429,404). Conventional tracking systems use one of several different types of sensors such as millimeter-wave, laser, ultrasonic wave, or infrared/visual imaging sensors. There are also numerous types of tracking apparatuses and signal processing schemes for use in conjunction with conventional tracking systems, including visual image tracking systems.

Conventional image tracking systems can be divided into two groups, single imaging systems and plural imaging systems. Single imaging systems (those having a single imaging camera) generally have a simpler configuration and image-processing scheme than plural imaging systems (those having multiple imaging cameras). However, single imaging systems cannot produce three-dimensional information. Furthermore, it is difficult to extract distance information from a single imaging system unless it is used in combination with a device such as a range finder. Additionally, because the field of view (FOV) of the imaging system is limited, it is easy to lose track of fast moving objects (that is, the single imaging systems typically have a high 'tracking dropout' rate).

FIGS. 1A-1B are block diagrams of prior art image tracking systems (tracking systems). In FIG. 1A, the image tracking system 100 includes an imaging camera (camera system) 101 configured to capture images. The imaging camera 101 may use either a visual or infrared wavelength. Imaging cameras using a visual wavelength may acquire a color image, but do not perform well at night or in heavy fog. Imaging cameras using an infrared wavelength cannot acquire a color image, but may be used at night or in heavy fog. Regardless of whether the imaging camera uses visual or infrared light, the construction of the imaging camera may be similar in its components.

An image sensor 102 is coupled to the imaging camera 101, configured to sense an image. The image sensor 102 may use either a visual or infrared wavelength. The image tracking system 100 also includes an image processor 103, communicatively coupled to the image sensor 102, configured to process the images sensed by the image sensor 102 and to generate an output signal 106. In the system, the image processor 103 may include an object-identifying algorithm.

In FIG. 1B, the prior art image tracking system 170 includes a tracking controller 104, communicatively coupled to the image processor 103. The image processor 103 is configured to generate image data 106 and position information of a tracked object and the tracking controller is configured to generate a tracking signal 108. In one embodiment, the tracking controller 104 includes a camera attitude control algorithm and attitude controller. A movement system 105 is mechanically coupled to the imaging camera 101 and communicatively coupled to the tracking controller 104, configured to adjust the attitude of the imaging camera 101 in response to the tracking signal 108 from the tracking controller 104. In one embodiment, the movement system 105 may include, for example, a servo or gimbal system.

Plural imaging systems are capable of generating three-dimensional information and reducing the dropout rate by using two lenses with different FOVs, one narrow FOV for high resolution image and one wide FOV for low tracking dropout rate. However, use of multiple imaging cameras in the plural imaging systems complicates the structure of the tracking system and its image-processing algorithm.

Image tracking systems typically require that the image of object being tracked be in the center of the image sensor, requiring a camera attitude control system. Typically, the attitude of the imaging camera is adjusted using a servo motor or a gimbal system.

U.S. Pat. No. 6,734,911 describes using a dual-angle lens to obtain both wide-angle imaging and narrow-angle imaging of a scene. However, the system described in the '911 patent uses a very complex lens and generates large image distortion for wide-angle imaging. Furthermore, this system requires that the attitude of the imaging camera be adjusted by a servo motor.

Therefore, what is needed is an optical tracking system offering a highly adjustable field of view with minimal distortion and simplified construction.

SUMMARY OF INVENTION

The present invention addresses the problems of the prior art and provides an optical tracking system using a variable focal length lens.

In one embodiment, an optical system includes at least one camera system, and the at least one camera system includes an objective lens system, configured to receive an object image, and at least one micromirror array lens, optically coupled to the objective lens system, configured to focus the object image received by the objective lens system onto an image sensor. The image sensor is optically coupled to the micromirror array lens, configured to receive the focused object image from the micromirror array lens and to sense the focused object image.

In one aspect of the invention, the optical system also includes an image processor, communicatively coupled to the image sensor, configured to process the object image sensed by the image sensor and to generate image data and position information of the object.

In another aspect of the invention, the optical system also includes a tracking controller, communicatively coupled to the image processor, configured to generate a tracking signal to control at least one of the group consisting of: an attitude of the camera system, an optical axis of the micromirror array lens, and a focal length of the micromirror array lens. In another aspect of the invention, the tracking controller includes an attitude control algorithm to control the attitude of the camera system. In another aspect of the invention, the tracking controller includes a control algorithm to control at least one of the group consisting of: the optical axis of the micromirror array lens, and the focal length of the micromirror array lens.

In another aspect of the invention, the optical system also includes a movement system, mechanically coupled to the camera system and communicatively coupled to the tracking controller, configured to adjust the attitude of the camera system in response to the tracking controller signal. In another aspect of the invention, the movement system includes at least one of the group consisting of: a servo, and a gimbal system.

Because the focal length of a micromirror array lens (MMAL) can be quickly changed, a narrow FOV for high resolution image and wide FOV for low tracking dropout in an imaging device can be realized using time-sharing technique. It is also possible to adjust the optical axis of the MMAL to make an object image in the center of the image sensor. The optical axis changing characteristic of the MMAL provides potential for a tracking system does not use a servo mechanism for controlling camera attitude for a limited range. When the MMAL is used in imaging device of a tracking system, the system can be simpler and weigh less than conventional tracking systems.

The advantages of the present invention include ability to rapidly change the focal length and optical axis of a camera system, allowing for high-resolution, wide-angle imaging.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
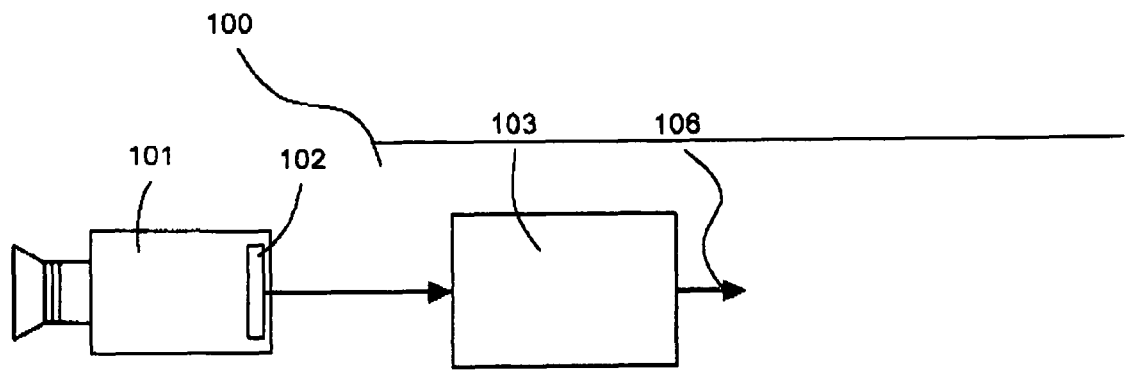
FIGS. 1A-1B are block diagrams of conventional image tracking systems.
Figure 1B:
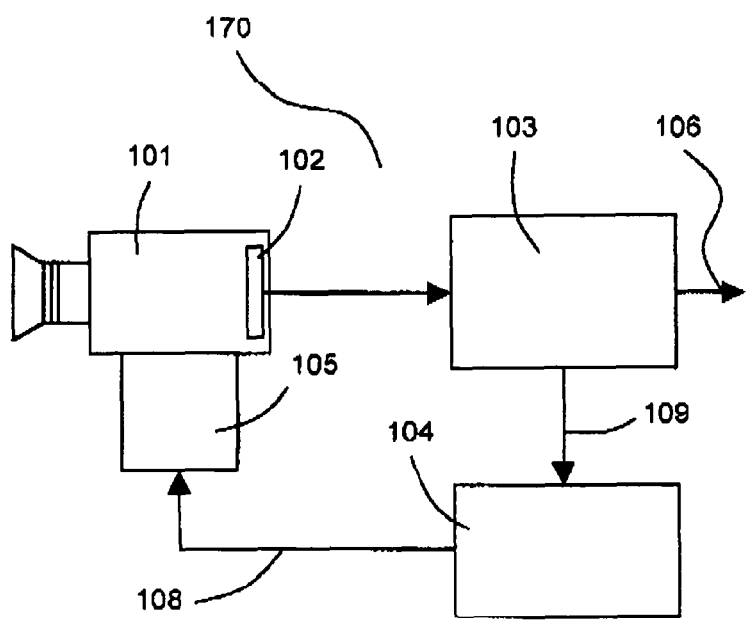

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

An optical tracking system (tracking system) using a variable focal length lens (micromirror array lens) includes a plurality of micromirrors. Because of the ease of fast adjusting the focal length of the lens by adjusting the micromirrors (by rotation and/or translation) the tracking system may provide a high-resolution image and fast object tracking capabilities with low tracking dropout rate. To obtain high-resolution images, the tracking system is configured to have a small field of view (FOV). However, since tracking systems having small FOVs may easily lose a tracked object, a large FOV is required to reduce tracking dropout. Thus, by rapidly changing the focal length of the micromirror array lens (MMAL), a high-resolution image as well as a wide-angle image may be provided.

A variable focal length lens (micromirror array lens) including a plurality of micromirrors is described in U.S. patent application Ser. Nos. 10/855,287, 10/857,714, 10/855,554, 10/855,715, 10/857,796, and 10/857,280, which are hereby incorporated by reference. As described in the Ser. Nos. 10/855,287, 10/857,714, 10/855,715, and 10/857,280 applications, by translation and/or rotation of each micromirror in a micromirror array lens, a variable focal length lens capable of having the direction of its optical axis changed is provided. High speed tracking can be performed by controlling the optical axis of the micromirror array lens. The changes of focal length and optical axis may be performed rapidly, due to the use of independently adjustable micromirrors.

Because the focal length of the micromirror array lens described in the Ser. Nos. 10/855,287, 10/857,714, 10/855,554, 10/855,715, 10/857,796, and 10/857,280 applications may be rapidly changed, the micromirror array lens is well suited for an imaging device (imaging camera) that provides a narrow field of view (FOV) for a high resolution image and a wide FOV for low tracking dropout, using a time-sharing technique. Furthermore, as stated above with reference to the Ser. Nos. 10/855,287, 10/857,714, 10/855,715, and 10/857,280 applications, the optical axis of micromirror array lenses may be adjusted, providing a way to image a tracked object in the center of the image sensor. The ability to change the optical axis of the micromirror array lens may allow for an optical tracking system that does not require a servo mechanism or gimbal system for controlling the attitude of the imaging camera. Furthermore, when a micromirror array lens is used in an imaging camera as part of an imaging tracking system, the tracking system may have a simpler construction and weigh less than a conventional tracking system.

Figure 2A:
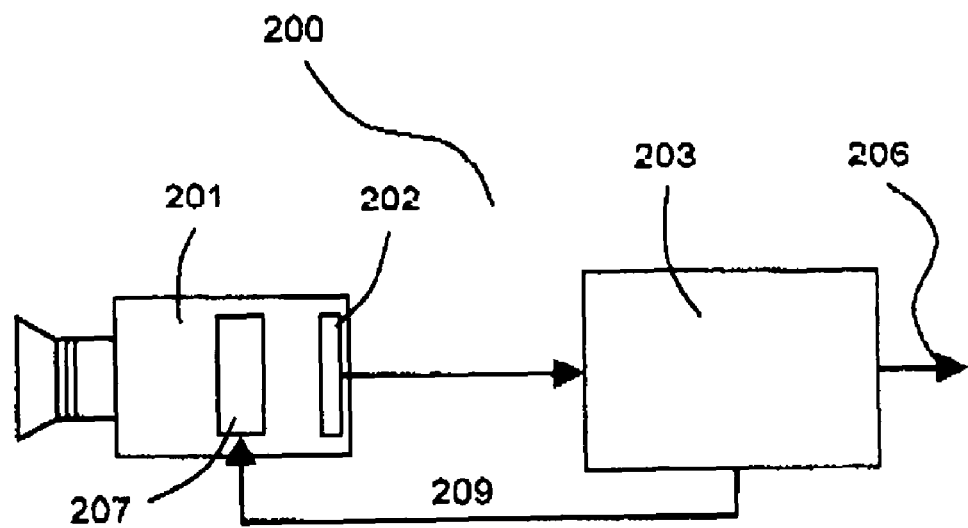
FIGS. 2A-2B are block diagrams of image tracking systems, according to different embodiments of the present invention.
Figure 2B:
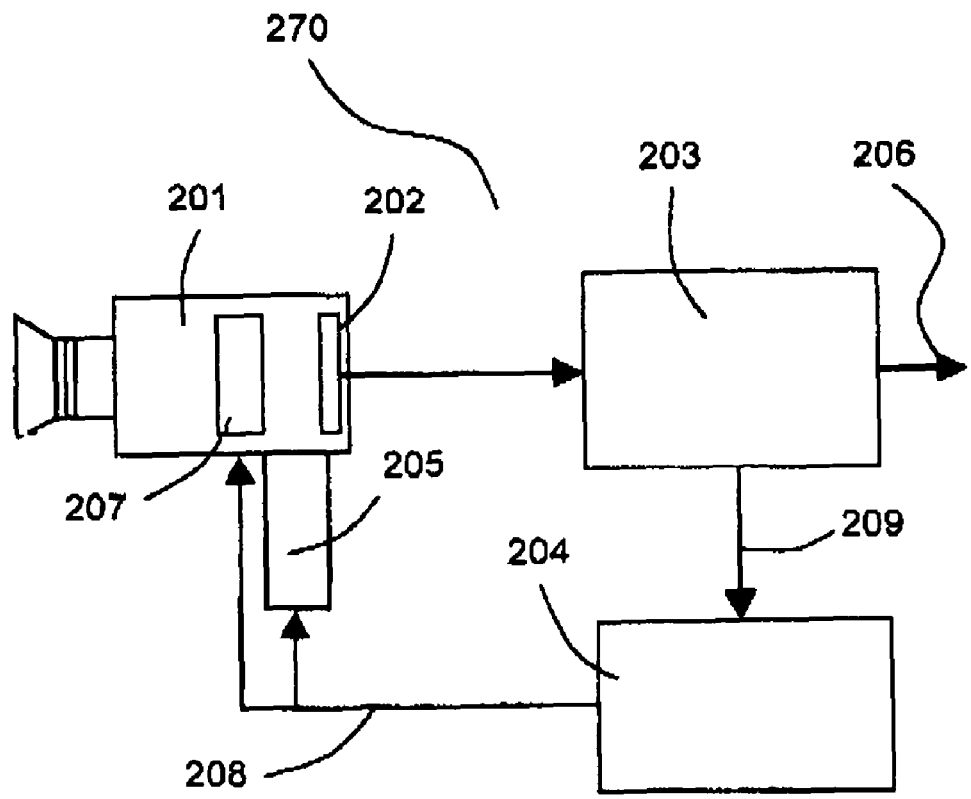

FIGS. 2A-2B are block diagrams of image tracking systems (tracking systems or camera systems), according to different embodiments of the present invention. In the embodiment depicted in FIG. 2A, an image tracking system 200 includes an imaging camera 201 having an objective lens system configured to receive an object image. The image tracking system 200 also includes a micromirror array lens 207, optically coupled to the imaging camera 201, configured to focus the object image received by the imaging camera 201 onto an image sensor 202. The micromirror array lens 207 may also be configured to change the focal length, field of view (FOV), and/or optical axis of the image tracking system. The image sensor 202 is optically coupled to the micromirror array lens 207, and is configured to receive the focused object image from the micromirror array lens 207 and to sense the focused object image. The image tracking system 200 also includes an image processor 203, communicatively coupled to the image sensor 202, configured to process the object image sensed by the image sensor 202 and to generate an output signal including image data and position information 206 of the tracked object. In one embodiment, the image processor 203 includes an object identification and recognition algorithm.

In the embodiment depicted in FIG. 2B, an image tracking system 270 includes a tracking controller 204, communicatively coupled to the image processor 203. The image processor 203 is configured to generate a position information of the tracked object and the tracking controller 204 generates a tracking signal 208. In one embodiment, the tracking signal 208 is configured to control the attitude of the camera system, the optical axis of the micromirror array lens, and/or the focal length of the micromirror array lens. In one embodiment, the tracking controller 204 includes an attitude control algorithm to control the attitude of the camera system 270. In one embodiment, the tracking controller 204 includes a control algorithm to control the optical axis of the micromirror array lens, and/or the focal length of the micromirror array lens.

A movement system 205 is mechanically coupled to the imaging camera 201 and communicatively coupled to the tracking controller 204, configured to adjust the attitude of the imaging camera 201 in response to the tracking signal 208 from the tracking controller 204. The micromirror array lens 207 is communicatively coupled to the tracking controller 204, configured to adjust the field of view (FOV) and/or optical axis of the imaging camera 201 in response to the tracking signal 208 from the tracking controller 204. In one embodiment, the movement system 205 may include, for example, a servo or gimbal system.

Figure 3:
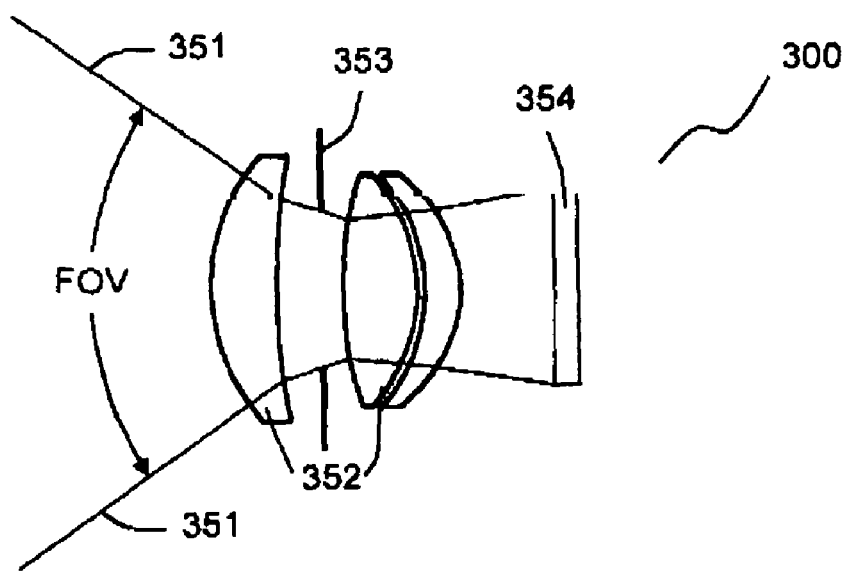
FIG. 3 is a schematic representation illustrating field of view (FOV) of an imaging camera system.

FIG. 3 is a schematic representation illustrating field of view (FOV) of an imaging camera system 300. A lens system 352 is optically coupled to an image sensor 354. A stop 353 is coupled to the lens system 352. A light ray 351 passes the edge of the stop 353. The field of view of the camera system is determined by the relative position and/or size of the lens system 352, the stop 353, and the image sensor 354.

For a high-resolution image, a camera system has a narrow angle of FOV. As FOV is decreased, the capturing area of the camera becomes narrow, and the object being tracked may be lost more easily (increase in dropout rate). Therefore, to increase or broaden the capturing area, the FOV of the camera must be increased. As the FOV is increased, the dropout rate of the tracked object decreases. However, the dropout rate of the tracked object increases as the speed of the object increases. In a conventional camera system, rapid change of the FOV is difficult because the response time of the lens driving system is relatively slow.

However, a lens system using a micromirror array lens, as described in the embodiments of the present invention, is capable of rapid change in focal length. By using a time-sharing technique, the imaging camera/tracking system with micromirror array lens may obtain both a narrow angle image and a broad angle image in a short time period. Therefore, the dropout rate of the tracked object is reduced and a high-resolution image is maintained. Furthermore, by making rapid change of the focal length, the imaging camera/tracking system with a micromirror array lens may maintain focus on a fast moving object. The principles of maintaining focus on a fast moving object are described in detail in U.S. Ser. No. 10/896,146.

Figure 4:
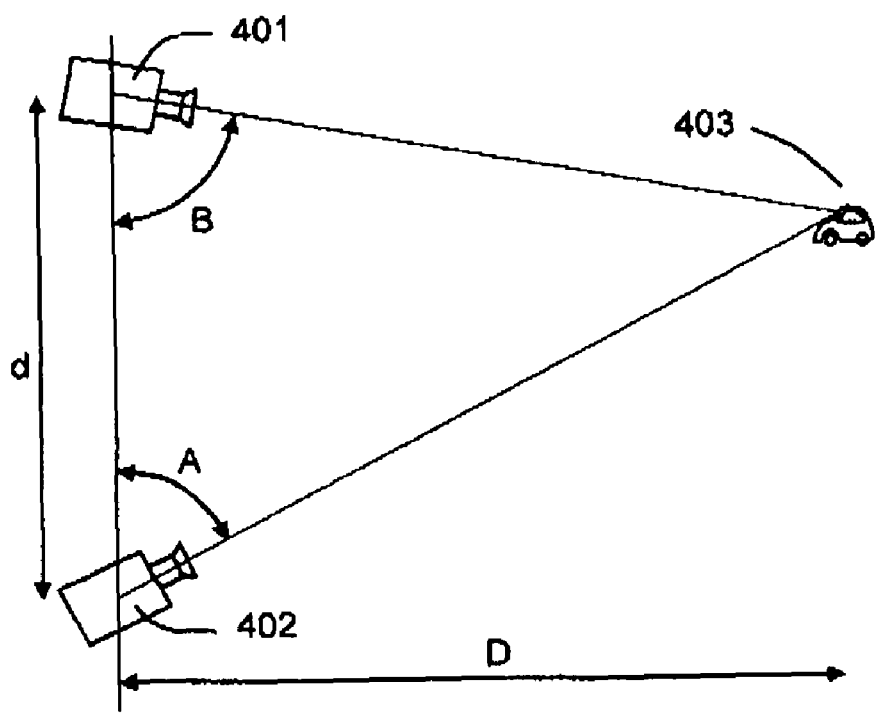
FIG. 4 is a schematic representation illustrating acquisition of distance information using two conventional cameras.

FIG. 4 is a schematic representation illustrating acquisition of distance information using two conventional cameras. A camera 1 401 is placed at a distance d away from a camera 2 402. The camera 1 and the camera 2 track an object 403. In order to track the object 403, the camera 1 is positioned at an angle B with respect to a vertical axis and the camera 2 is positioned at an angle A with respect to the vertical axis. The horizontal distance D from the cameras 1 and 2 to the object 403 is determined using the formula:

$$D = \left(\frac{\tan A \times \tan B}{\tan A + \tan B}\right)d$$

Figure 5:
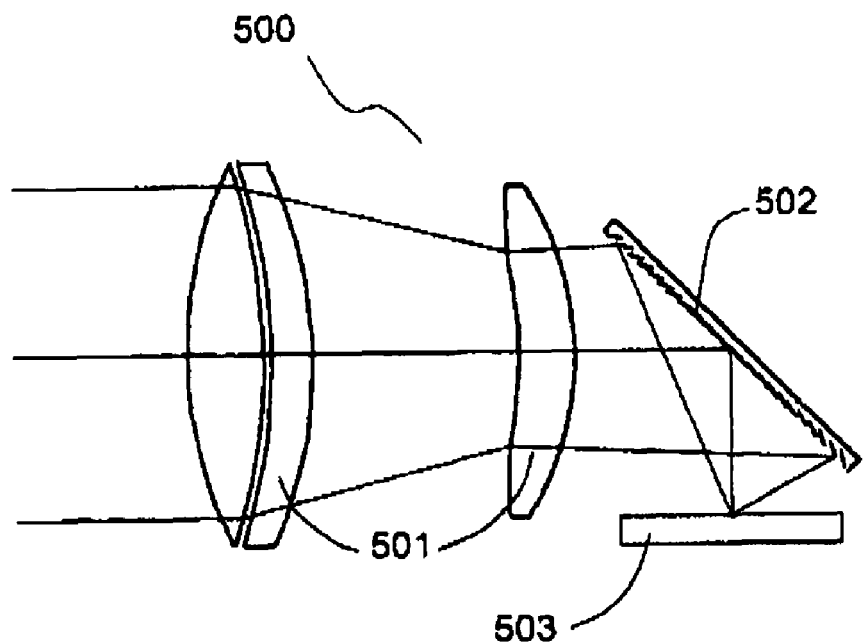
FIG. 5 is a schematic representation of an imaging system using a micromirror array lens, according to one embodiment of the present invention.

FIG. 5 is a schematic representation of an imaging system 500 using a micromirror array lens. In the embodiment depicted with respect to FIG. 5, the imaging system 500 includes an objective lens system 501, configured to receive an object image. The configuration of the lens system 501 shown in FIG. 5 is exemplary only. The lens system 501 may include any number of lenses and have different lens shapes. Furthermore, the lens system 501 may be combined with a conventional zoom lens system. A micromirror array lens (MMAL) 502 is optically coupled to the lens system 501, configured to focus the image received from the objective lens system 501. An image sensor 503 is optically coupled to the micromirror array lens 502, configured to sense the image focused by the micromirror array lens 402. The image sensor 503 may be a CCD (charge coupled device) or CMOS (complementary metal-oxide semiconductor) or other type of image sensor.

Figure 6:
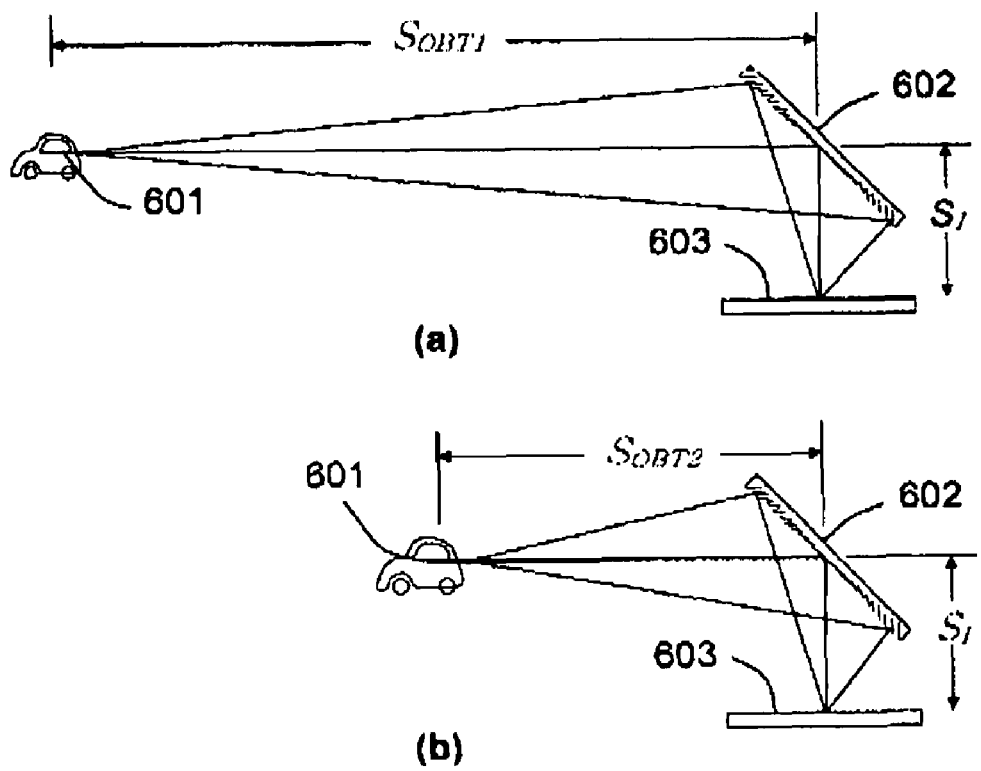
FIGS. 6A-6B are schematic representations illustrating measurement of object distance at two different times, according to one embodiment of the present invention.

FIGS. 6A-6B are schematic representations illustrating measurement of object distance at two different times. A tracking camera with a micromirror array lens 602 is optically coupled to an image sensor 603. The distance from the center of the tracking camera 602 to the image sensor 603 is $S_1$. The distance from the center of the tracking camera 602 to the tracked object 601 is $S_{OBT1}$ at time=$t_1$, as shown in FIG. 6A and $S_{OBT2}$ at time=$t_2$, as shown in FIG. 6B. By fixing the distance ($S_1$) from the center of the tracking camera 602 to the image sensor 603, and controlling the effective focal length (f) of the tracking camera 602 the distance to the tracked object 601 ($S_{OBT}$) may be determined using the formula:

$$1/f = 1/S_{OBT} + 1/S_1$$

Figure 7:
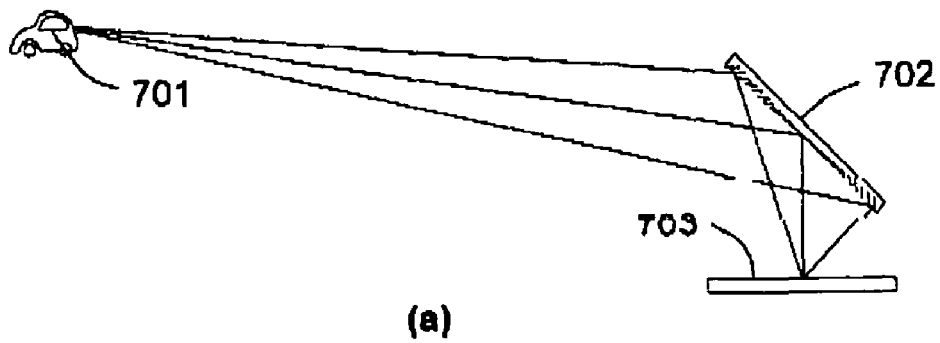
FIGS. 7A-7B are schematic representations illustrating tracking of an object by changing the optical axis of the camera, according to one embodiment of the present invention.
Figure 7:
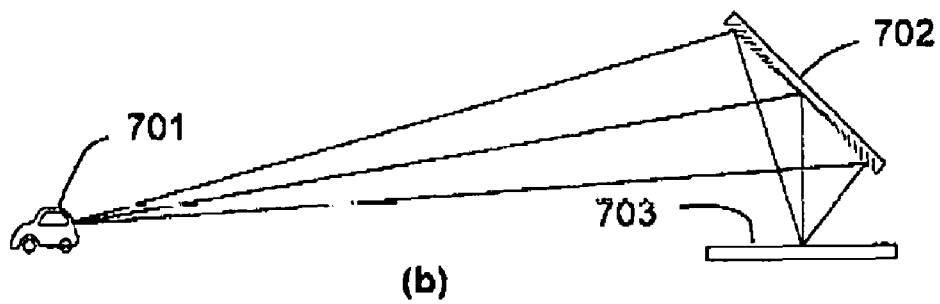

FIGS. 7A-7B are schematic representations illustrating tracking of an object by changing the optical axis of a camera. The tracked object 701 may be imaged in the center of image sensor 703 by adjusting the optical axis of a micromirror array lens of the tracking camera 702. Thus, it is not necessary to use a servo or gimbal system to control the attitude of tracking camera 702. Adjusting the view angle of the tracking camera 702 by adjusting the optical axis of a micromirror array lens allows the tracking camera to track the object 701 very quickly, because the response time of a micromirror array lens is very fast.

Figure 8:
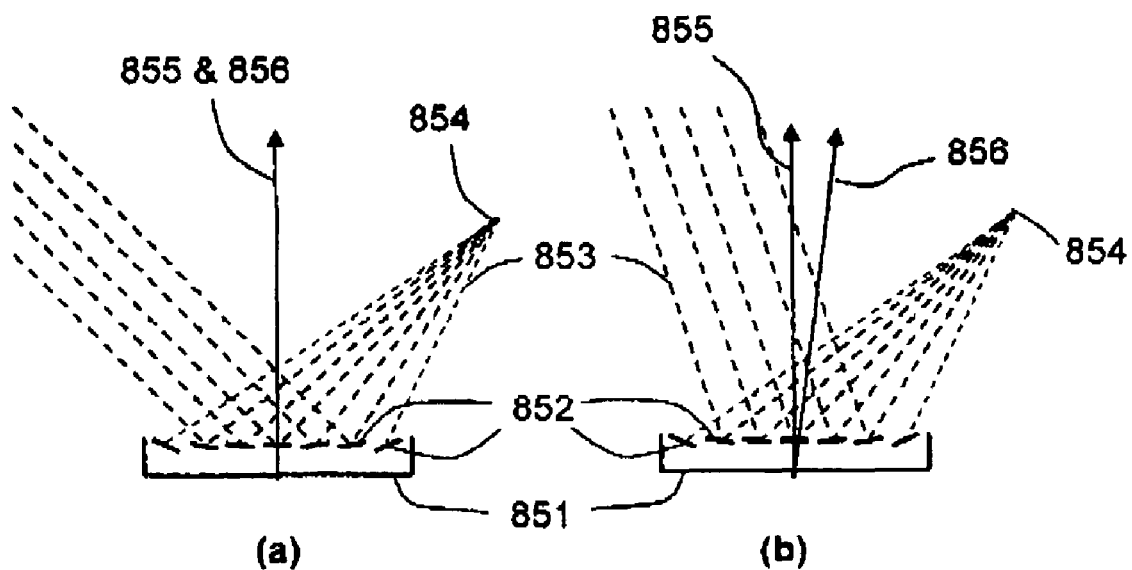
FIGS. 8A-8B are schematic representations illustrating changing of the optical axis of a micromirror array lens, according to one embodiment of the present invention.

FIGS. 8A-8B are schematic representations illustrating changing of the optical axis of a micromirror array lens. A micromirror array lens 851 includes micromirrors 852. A light ray 853 is focused onto a point 854. In FIG. 8A, optical axis 856 has the same direction as a vector 855 normal to the plane of the micromirror array lens 851. In FIG. 8B, optical axis 856 has a different direction from the vector 855 normal to the plane of the micromirror array lens 851. As shown in FIGS. 8A-8B, by changing the optical axis of the micromirror array lens 851 by controlling each micromirror 852, the micromirror array lens 851 may focus two different rays with different incident angles to the normal vector of a micromirror array on the same point 854.

Referring again to FIGS. 7A-8B, the micromirror array lens is capable of having its optical axis changed very rapidly. By changing the optical axis of the micromirror array lens through adjustment of the micromirrors, the imaging camera/tracking system may image the tracked object in the center of the image sensor without adjustment of the tracking camera/tracking system attitude. Rapid changes to the optical axis of the micromirror array lens allow the imaging camera/tracking system to track fast-moving objects and reduce dropout rate.

Figure 9:
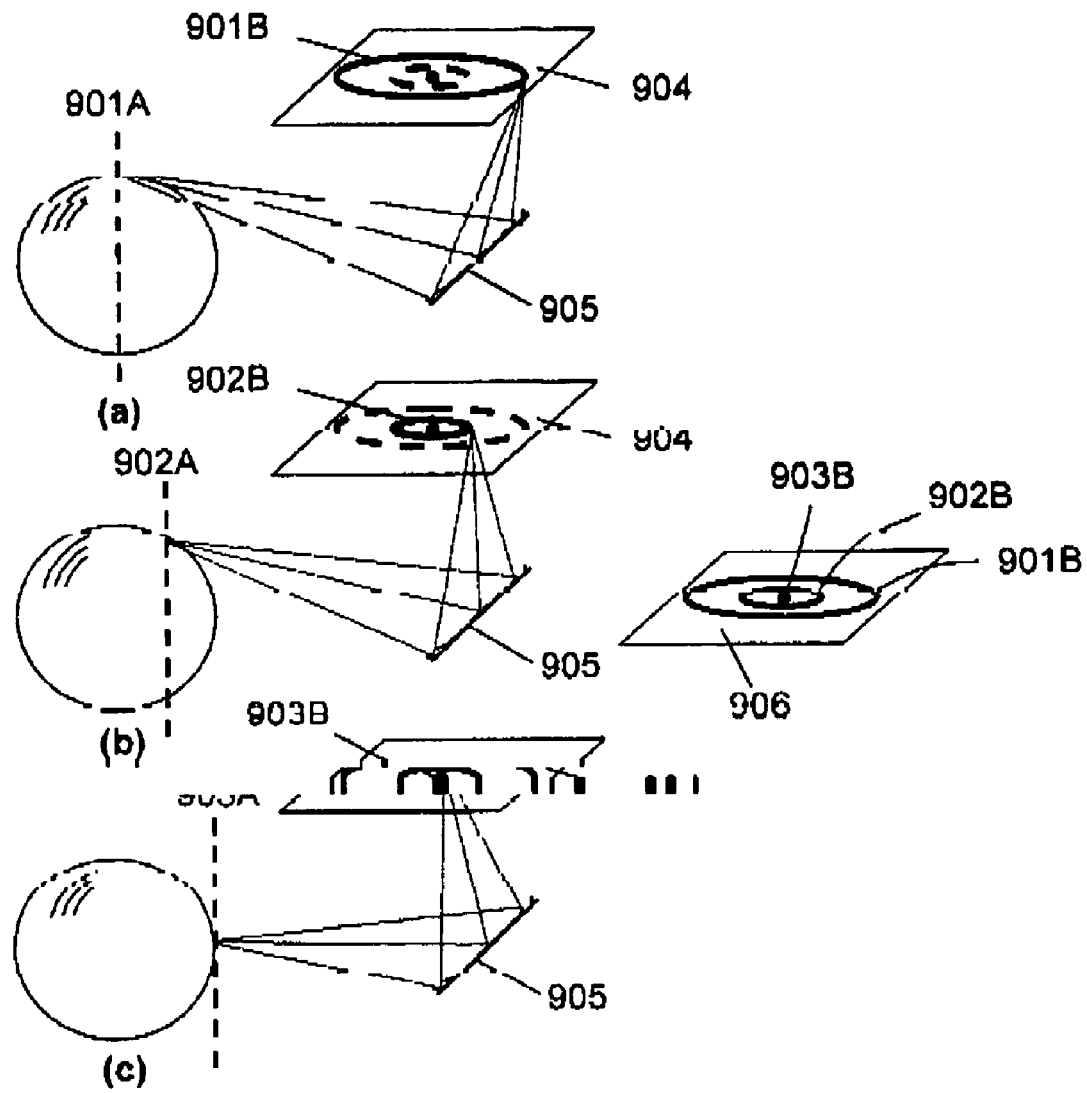
FIGS. 9A-9C are schematic representations illustrating acquisition of three-dimensional information, according to one embodiment of the present invention.

FIGS. 9A-9C are schematic representations illustrating acquisition of three-dimensional information. FIG. 9A depicts a camera system with a micromirror array lens 905 in a first focused plane 901A. The in-focus image 901B projected onto the image sensor 904 corresponds to the camera system 905 in focused plane 901A. FIG. 9B depicts the camera system 905 in a second focused plane 902A. The in-focus image 902B projected onto the image sensor 904 corresponds to the camera system 905 in focused plane 902A. FIG. 9C depicts the camera system 905 in a third focused plane 903A. The in-focus image 903B projected onto the image sensor 904 corresponds to the camera system 905 in focused plane 903A. A three-dimensional image profile 906 with all-in-focused image and depth information is provided, using the in-focus images 901B, 902B, and 903B.

The focal (focused) plane of an imaging device is changed by changing the focal length of each micromirror array lens. An imaging unit includes one or more two-dimensional image sensors that taking an original two-dimensional image at each focal plane. An image processing unit generates the all-in-focus image and the depth information for in-focus image from original two-dimensional images. All the processes are achieved within a unit time which is less than or equal to the afterimage time of the human eye.

The image sensor takes original two-dimensional images with different focal planes that are shifted by changing the focal length of the micromirror array lens. The image processing unit extracts in-focus pixels or areas from original pictures at different focal planes and generates an all-in-focus image. Three-dimensional information of the image can be obtained from the focal plane of each in-focus pixel.

By changing the focal length of the camera system 905 in multiple steps, a single imaging camera/tracking system using a micromirror array lens may acquire three-dimensional information about a tracked object. The principles of acquiring three-dimensional information are described in detail in U.S. patent application Ser. No. 10/822,414 (Apr. 12, 2004).

Figure 10:
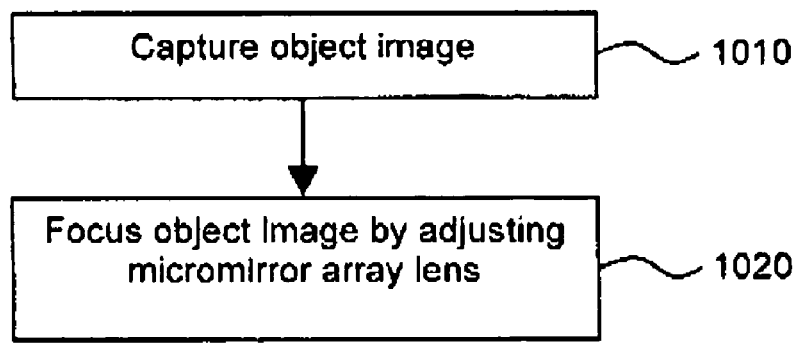
FIG. 10 is a flow diagram of a method in an optical system having at least one micromirror array lens, according to an embodiment of the invention.

FIG. 10 is a flow diagram of a method in an optical system having at least one micromirror array lens. At step 1010, an object image is captured. At step 1020, the object image is focused by adjusting the micromirror array lens. In one embodiment, the method also includes adjusting the focal length of the optical system by adjusting the micromirror array lens. In another embodiment, the method also includes adjusting the field of view of the optical system by adjusting the micromirror array lens. In another embodiment, the method also includes adjusting the optical axis of the optical system by adjusting the micromirror array lens. In one embodiment, the adjusting of the optical axis of the optical system by adjusting the micromirror array lens is performed quickly to provide a large searching area. In another embodiment, the method also includes measuring the distance a tracked object by adjusting the micromirror array lens. In another embodiment, the method also includes measuring three-dimensional information of a tracked object by adjusting the micromirror array lens. In another embodiment, a time-sharing technique (with one camera) is used with the optical system to obtain a wide field of view image and a narrow field of view image within a short time period.

In one embodiment of the present invention, the imaging device (imaging camera) may have a configuration similar to a prior art imaging device, except that a micromirror array lens is used. Furthermore, many different image processing techniques may be used in conjunction with the embodiments of the present invention, including those techniques found in the prior art. Additionally, in one embodiment, the tracking system may have a similar configuration to that of the prior art.

The terms 'optical tracking system', 'image tracking system', and 'tracking system' are used interchangeably. The terms 'imaging device', 'imaging camera', and 'camera system' are used interchangeably.

The advantages of the present invention include ability to rapidly change the focal length and optical axis of a camera system, allowing for high-resolution, wide-angle imaging.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical system comprising at least one camera system, the at least one camera system including:
   an objective lens system, configured to receive an object image;
   at least one micromirror array lens, optically coupled to the objective lens system, comprising a plurality of micromirrors and a plurality of variable supporters controlling the micromirrors, and configured to focus the object image received by the objective lens system onto an image sensor and correct aberration, wherein position of the micromirror is determined by the variable supporters that the micromirror rests on; and
   the image sensor, optically coupled to the micromirror array lens, configured to receive the focused object image from the micromirror array lens and to sense the focused object image.

2. The optical system of claim 1, further comprising:

an image processor, communicatively coupled to the image sensor, configured to process the object image sensed by the image sensor and to generate image data and position information of the object.

3. The optical system of claim 2, wherein:
the image processor includes an object identification and recognition algorithm.

4. The optical system of claim 2, further comprising: a tracking controller, communicatively coupled to the image processor, configured to generate a tracking signal to control at least one of the group consisting of:
an attitude of the camera system;
an optical axis of the micromirror array lens; and a focal length of the micromirror array lens.

5. The optical system of claim 4, wherein the tracking controller includes an attitude control algorithm to control the attitude of the camera system.

6. The optical system of claim 4, wherein the tracking controller includes a control algorithm to control at least one of the group consisting of:
the optical axis of the micromirror array lens; and
the focal length of the micromirror array lens.

7. The optical system of claim 4, further comprising:
a movement system, mechanically coupled to the camera system and communicatively coupled to the tracking controller, configured to adjust the attitude of the camera system in response to the tracking controller signal.

8. The optical system of claim 7, wherein:
the movement system includes at least one of the group consisting of:
a servo; and
a gimbal system.

9. The optical system of claim 1, wherein the at least one camera system includes a zoom lens system.

10. A method in an optical system having at least one micromirror array lens, comprising:
capturing an object image; and
focusing the object image by adjusting the micromirror array lens comprising a plurality of micromirrors and a plurality of variable supports controlling the micromirrors, wherein position of the micromirror is determined by the variable supporters that the micromirror rests on, wherein the micromirrors in the micromirror array lens are controlled to correct aberration.

11. The method of claim 10, further comprising:
adjusting the focal length of the optical system by adjusting the micromirror array lens.

12. The method of claim 10, further comprising:
adjusting the field of view of the optical system by adjusting the micromirror array lens.

13. The method of claim 10, further comprising:
adjusting the optical axis of the optical system by adjusting the micromirror array lens.

14. The method of claim 13, wherein:
the adjusting of the optical axis of the optical system by adjusting the micromirror array lens is performed quickly to provide a large searching area.

15. The method of claim 10, further comprising:
measuring the distance a tracked object by adjusting the micromirror array lens.

16. The method of claim 10, further comprising:
measuring three-dimensional information of a tracked object by adjusting the micromirror array lens.

17. The method of claim 10, further comprising:
Using a time-sharing technique with the optical system to obtain a wide field of view image and a narrow field of view image within a short time period.

18. The optical system of claim 1, wherein heights of the variable supporters are changed to control the micromirrors.

19. The optical system of claim 1, wherein in-plane positions of the variable supporters are changed to control the micromirrors.

20. The method of claim 10, further comprising:
changing heights of the variable supporters to control the micromirrors.

21. The method of claim 10, further comprising:
changing in-plane positions of the variable supporters to control the micromirrors.

* * * * *